J. S. Williams,
Motor.

No. 81,967. Patented Sep. 8, 1868.

Witnesses.
F. Schoet
John Kenny

Inventor.
John Williams

United States Patent Office.

JOHN S. WILLIAMS, OF CHICAGO, ILLINOIS.

Letters Patent No. 81,967, dated September 8, 1868.

IMPROVEMENT IN DOUBLE RATCHET-LEVER POWER.

*The Schedule referred to in these Letters Patent and making part of the same.*

TO ALL WHOM THIS MAY CONCERN:

Be it known that I, JOHN S. WILLIAMS, of Chicago, in the county of Cook, and State of Illinois, have invented an Improved Double Ratchet-Lever Power; and I do hereby declare that the following is a full, clear, and exact description of the construction and operation of the same, reference being had to the accompanying drawings and letters marked thereon, making a part of this specification, in which—

Figure 1:
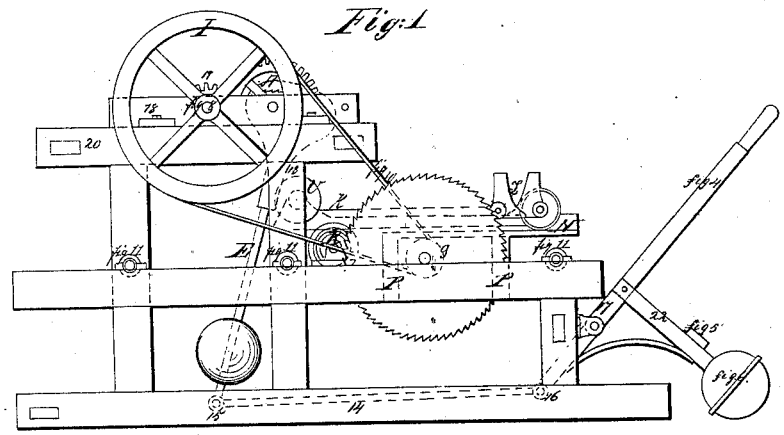

Figure 1 is a longitudinal elevation of my invention.

Figure 2:
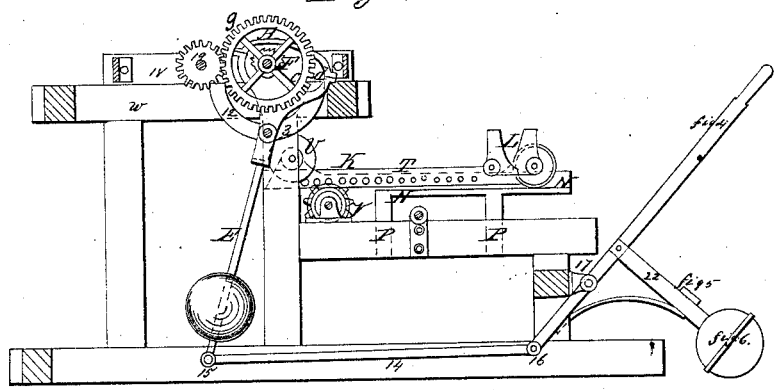

Figure 2, a longitudinal sectional elevation of the same.

Figure 3:
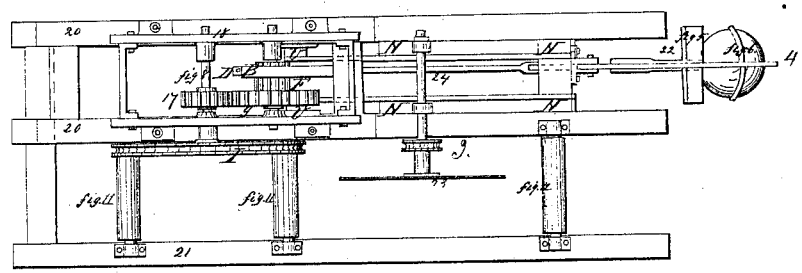

Figure 3, a plan or top view of the invention.

A D, figs. 1 and 2, represent a double ratchet-pawl, made of iron or other suitable material, and arranged to operate on both sides of a ratchet-pinion or wheel F, which wheel communicates motion to a cogged drive-wheel, $g'$, both wheels being attached to the same shaft; and this pawl terminates in a lever, E, which is pivoted to a semicircular plate, 12, figs. 1 and 2, at 13, said plate being rigidly attached to a frame, 20, and the lower end of the lever jointed to a connecting-rod, 14.

The cog-wheel $g'$ is made to drive a pinion, 19, secured to a shaft, Figure 8, which shaft has bearings in a metal frame, 18, and supports a band or drive-wheel, I.

The connecting-rod 14 is jointed to the lower end of a lever, Figure 4, which is pivoted to a lug, 17, attached to one end of the frame 20, and this lever has attached to it an arm, 22, which supports a balancing-weight, Figure 6, and a foot-treadle, Figure 5, as shown in all of the figures.

It will be seen, from this description, that if the lever, fig. 4, is made to rotate on the pivot at 17, the rod 14 will have a reciprocating motion and cause the lever E to rotate on the pivot 13, which operation will cause the double ratchet-pawl A D to turn the pinion F, and communicate motion to the drive-wheel I.

The power, as shown, is arranged to drive a circular saw, 23, figs. 1 and 3, which, together with a pulley, 3, is attached to a journal, 24, having bearings fastened to the lower part of the frame 20, the saw being driven by a belt, Figure 10, passing over the pulley 3 and drive-wheel I.

The device, so far as the power is concerned, is very simple, and provides a hand-machine for doing a large amount of light labor, and it is particularly adapted for driving churns, turning-lathes, grindstones, &c., with much more ease to the operator than can be done by crank-power or any other means of which I have knowledge.

To put the power in motion, all that is required is for the operator to grasp the upper end of the lever, fig. 4, and cause it to rotate on the pivot, at 17, and at the same time put one foot on the treadle, fig. 5, and bear down on it at each time the upper end of said lever is brought outwardly from the machine.

Having thus described my invention, I claim, and desire to secure by Letters Patent—

1. The combination of the double ratchet-pawl A D, ratchet-pinion F, lever E, connecting-rod 14, lever, fig. 4, arm 22, treadle, fig. 5, and balancing-weight, fig. 6, substantially as set forth.

2. The combination of the ratchet-pinion F and gear-wheel $g'$, as and for the purpose set forth.

JOHN S. WILLIAMS.

Witnesses:
G. L. CHAPIN,
A. HAYWARD.